United States Patent [19]

Vincent

[11] Patent Number: 4,810,899

[45] Date of Patent: Mar. 7, 1989

[54] HIGH-VOLTAGE CONNECTION DEVICE, ESPECIALLY FOR A HIGH-VOLTAGE TRANSFORMER, WITHOUT LEAD-OUT CABLES AND WITH DETACHABLE POTENTIOMETER SET

[75] Inventor: Joel Vincent, Gray, France

[73] Assignee: Orega Electronique et Mecanique, Paris, France

[21] Appl. No.: 83,855

[22] PCT Filed: Dec. 9, 1986

[86] PCT No.: PCT/FR86/00427

§ 371 Date: Jul. 15, 1987

§ 102(e) Date: Jul. 15, 1987

[87] PCT Pub. No.: WO87/03737

PCT Pub. Date: Jun. 18, 1987

[30] Foreign Application Priority Data

Dec. 13, 1985 [FR] France ............................. 85 18521

[51] Int. Cl.[4] ............................................ H02G 15/00

[52] U.S. Cl. .................................... 307/147; 363/107; 363/126; 439/86; 439/592; 174/73.1; 174/77 R; 307/149

[58] Field of Search .................. 307/147, 148; 439/89, 439/125, 101, 86, 180, 181, 184, 185, 272, 275, 271, 258, 281, 365, 350, 339, 372, 489, 519, 510, 506, 592, 597, 607, 608, 609, 610, 88, 188; 336/70, 84 R, 84 C, 92, 94, 69, 82, 105, 107, 147, 150, 123, 170, 185, 198, 205, 223; 323/340, 308; 174/19, 22 R, 32, 16 HS, 35 SM, 17 LF, 71 R, 71 C, 75 D, 73 R, 77 R; 363/126, 146, 65

[56] References Cited

U.S. PATENT DOCUMENTS

| | | | |
|---|---|---|---|
| 2,003,176 | 5/1935 | Daly | 174/77 R |
| 2,379,942 | 7/1945 | Webber | 439/89 |
| 2,420,118 | 5/1947 | Anderson . | |
| 2,596,420 | 5/1952 | McGarvey | 439/87 X |
| 2,934,668 | 4/1960 | Dall . | |
| 3,084,210 | 4/1963 | Bluth et al. | 174/77 R X |
| 3,344,391 | 9/1967 | Ruete | 174/73 R X |
| 3,485,935 | 12/1969 | Kreuger | 174/73 R X |
| 3,550,203 | 12/1970 | Lemelson | 174/77 R |
| 3,745,438 | 7/1973 | Saeki | 363/126 |
| 3,784,729 | 1/1974 | Davis et al. | 439/592 X |
| 3,871,737 | 3/1975 | Dorrell et al. | 439/86 X |
| 3,947,959 | 4/1976 | Durocher . | |
| 4,246,636 | 1/1981 | Kawamura et al. | 363/146 |
| 4,408,176 | 10/1983 | Nakamura | 336/107 |
| 4,499,522 | 2/1985 | Nakamura | 336/107 X |

FOREIGN PATENT DOCUMENTS

| | | |
|---|---|---|
| 0068494 | 1/1981 | European Pat. Off. . |
| 0142200 | 5/1985 | European Pat. Off. . |
| 71570 | 1/1960 | France . |
| 2551259 | 3/1985 | France . |

OTHER PUBLICATIONS

Navy Technical Disclosure Bulletin, vol. 8, No. 3, Mar. 1983, (Washington, US), M. Hutchenreuther: "Improved Shorting Plug", pp. 89-92, Voir p. 91, lignes 21-26; FIGS. 1,2.

*Primary Examiner*—William M. Shoop, Jr.
*Assistant Examiner*—Paul Ip
*Attorney, Agent, or Firm*—Oblon, Fisher, Spivak, McClelland & Maier

[57] ABSTRACT

The high-voltage transformer of the invention is clipped on to its high-voltage lead-out cables. The ends of these cables are held firmly in conductive pads in ducts moulded with the coating of the transformer coil.

11 Claims, 3 Drawing Sheets

HIGH-VOLTAGE CONNECTION DEVICE, ESPECIALLY FOR A HIGH-VOLTAGE TRANSFORMER, WITHOUT LEAD-OUT CABLES AND WITH DETACHABLE POTENTIOMETER SET

BACKGROUND OF THE INVENTION

1. Field of the Invention

The present invention relates to a high-voltage connection device, especially for a high-voltage transformer without high-voltage lead-out cables and with a detachable potentiometer set.

2. Description of the Prior Art

A high-voltage (HV) connection, such as an automobile spark plug, is generally made with at least one connecting lug crimped on to the connection wire. The connecting lug may be a female lug that caps a terminal or male lug, or it may be a male lug inserted into a cup point or a female lug. A connection of this type therefore requires the crimping of a connecting lug on the connecting wire, and this operation calls for special equipment.

In general, a high-voltage transformer designed to power colour cathode tubes comprises a built-in potentiometer set which delivers the voltages of the pre-focusing and screen grids, G3 and G2 respectively, of these tubes. However, the high-voltage cable and lead-out cables of the grids G2 and G3 are fixed and form one piece with the transformer. These cables, the length of which varies with the user, create problems in the manufacturing, handling and assembly of transformers. Furthermore, the potentiometer set built into the transformer requires internal cabling operations which may impair the dependability of the product.

SUMMARY OF THE INVENTION

The object of the present invention is an HV connection device which can be easily and quickly used and requires no special equipment.

Another object of the present invention is a connection device for a high-voltage transformer in which the lead-out cables, such as the connection cable to the potentiometer set and the high-voltage cable, are detachable and set up a reliable connection which is as simple as possible.

SUMMARY OF THE INVENTION

The high-voltage connection according to the invention comprises a sleeve made of a preferably rigid insulating material. On the sleeve there is fixed a conductive pad into which elongated bodies (such as the cores of conducting wire) can easily penetrate. The conductive pad advantageously is composed of a silicone charged with electrically conducting powder.

The high-voltage transformer of the invention comprises detachable connection means to connect it to high-voltage lead-out cables. These means comprise, for each lead-out of the transformer, a device for the quick hooking of the cable and a device providing contact with the conductor or core of the cable. According to a preferred embodiment of the invention, the quick hooking device is a clip-on device comprising a first part which forms one piece with a duct which is integrally moulded with the sheath that covers the coating insulant of the transformer coil. The internal diameter of the duct is substantially equal to the external diameter of the cable, and the base of the duct is located above or near the corresponding outlet terminal or socket. The terminal or socket is connected to a conductive pad, preferably made of silicone charged with conductive material, which tightly sealing the base of the duct. The second part of the clip-on device is fixed to the cable near its end, and it is positioned in such a way that the end of the conductor or core of the cable is in good contact with the pad when the end of the cable penetrates into the duct and when the two parts of the quick hooking device are engaged with each other.

BRIEF DESCRIPTION OF THE DRAWINGS

The present invention will be better understood from the following detailed description of several embodiments taken as non-exhaustive examples and illustrated with reference to the appended drawings.

DESCRIPTION OF THE PREFERRED EMBODIMENT

Figure 4:
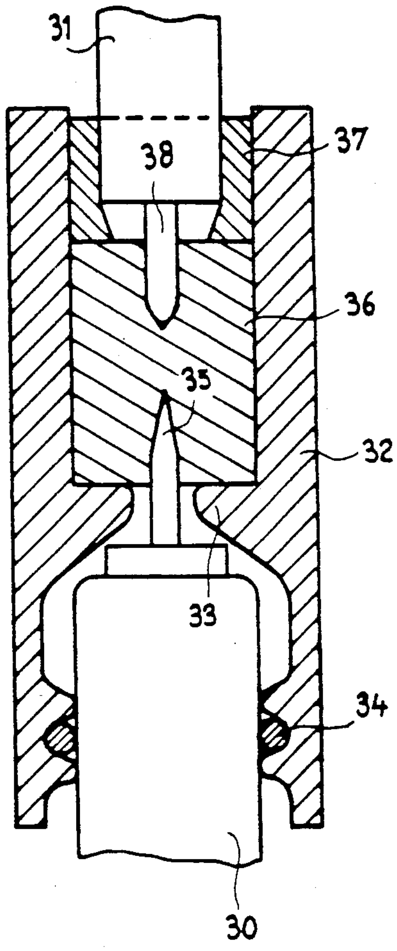
FIG. 4 is a cross-section view of a high-voltage connection device according to the invention.

FIG. 4 shows a high-voltage connection device according to the invention. The example shown pertains to the connection between an automobile spark plug and a very high-voltage power supply wire of this plug. However it is to be understood that the invention is not limited to this application , and it may be used to make any high-voltage connection, or even a low voltage connection, provided that a weak current is made to flow through it.

In the example of FIG. 4, shown when the connection is established, there is a connection to be made between a spark plug 30 and a high-voltage power supply wire 31. For this purpose, there is a sleeve 32 made of a rigid insulating material, comprising a throat 33 somewhat at its middle point. One of the ends of the sleeve 32 caps the spark plug 30, the throat 33 constituting a stop for the upper part of the spark plug 30. To ensure tight sealing on the side of the spark plug 30 an internal channel can be made near the shoulder of this end of the sleeve 32, a channel wherein a suitable gasket 34 can be set. The electrode of the spark plug 30 ends in an axial metallic point 35.

A conducting pad 36 is inserted with a slight degree of force into the other end of the sleeve 32. The internal contour of the conducting pad 36 is cylindrically shaped, and the conducting pad 36 comes to a stop at the throat 33. The length of the other end of the sleeve 32 is greater than the length of the conducting pad, 36 which is fixed to it by a ring 37. The ring 37 may be either screwed in or bonded or, again, it may be pressed in. The hole of the ring 37 is cylindrical towards the outside of the conducting sleeve and conical towards the pad 36. The cylindrical part of the hole has a diameter which is slightly smaller than the external diameter of the insulating material of the high-voltage power supply wire 31, while its conical part is used, when necessary, to guide the bare end (the core end) 38 of the wire 31 which penetrates into the conducting pad 36. Thus the ring 37 can be advantageously used as a sealing means for the connection on the wire 31 side. The point 35 is driven into the conducting pad 36 opposite to the core end 38. The conducting pad 36 is advantageously made of silicone charged with electrically conducting powder. The point 35 as well as the core end 38 can easily penetrate it without being necessarily pointed and without any risk of being twisted, for the core end 38, at least, must be relatively rigid.

Of course, a connection of this type cannot be used to let very high currents flow through, but it is very well suited to weak currents such as those of automobile spark plugs or high-voltage transformers for television.

The use of the connecting device of the present invention is explained below with reference to a high-voltage transformer for a television receiver with a focusing voltage output and high-voltage output for the anode of the cathode tube. However, it is to be understood that the invention applies to high-voltage transformers for television receivers comprising a different number of outputs as well as to high-voltage transformers reserved for other uses.

Figure 1:
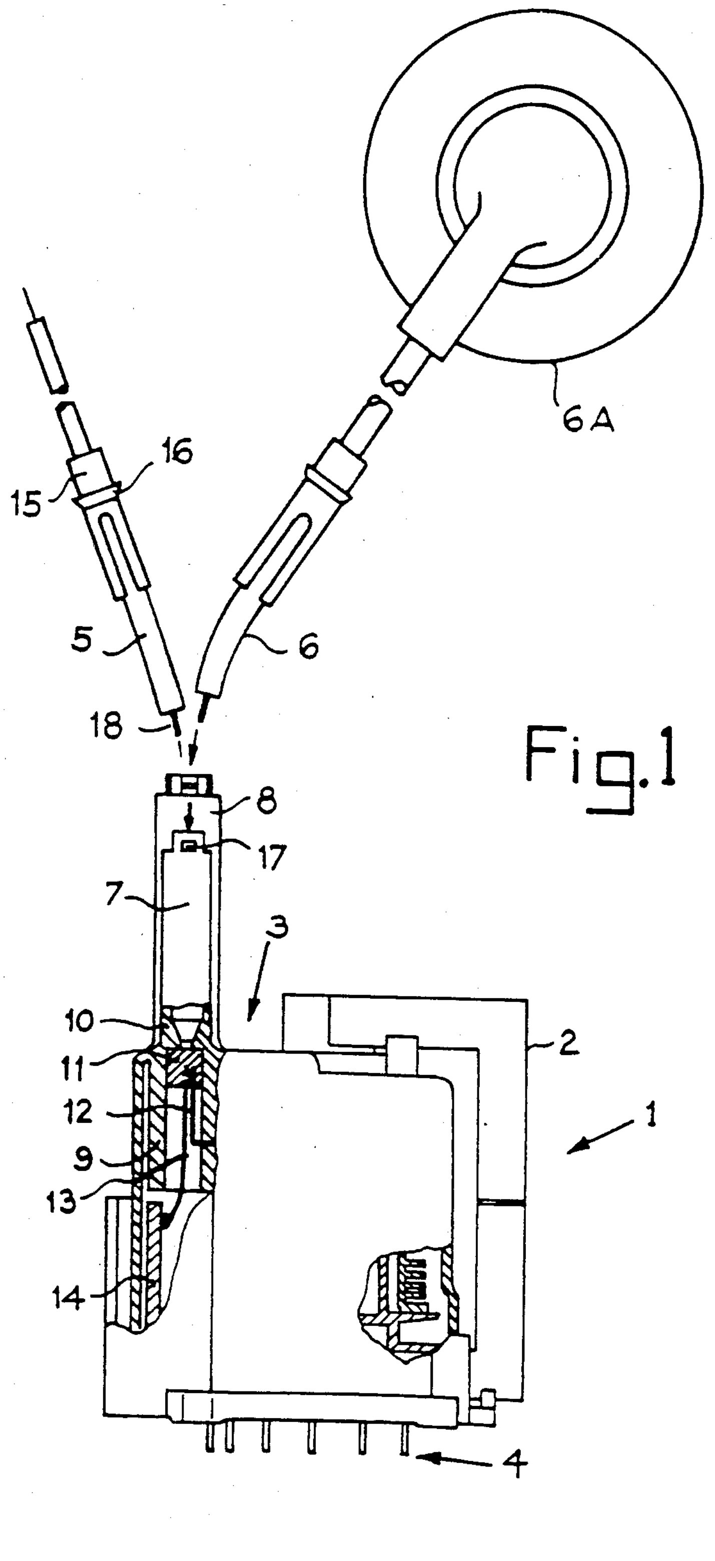
FIG. 1 is a partial cross-section view of a high-voltage transformer with two lead-out cables.

A high-voltage transformer 1, shown in FIG. 1, essentially comprises a magnetic circuit 2 and a coil 3 (not shown in detail) with several windings. The high-voltage transformer 1 may, for example, be of the split diode type namely, of the split secondary winding type with separation by diodes. The coil 3 is imperviously coated with a moulding resin, and the coating is lined with a protective sheath (which is not shown).

On one of its surfaces (for example, the inner surface), the transformer 1 has several pins 4 connected to primary windings and, if necessary, to the secondary low voltage windings of the coil 3. The pins 4 are designed to fix the transformer 1 to an appropriate printed circuit and to set up electrical connections with the conductors of this printed circuit.

In the present case, the transformer 1 comprises two high-voltage outputs. One high-voltage output focuses voltage to power the grids G2 and G3 of a cathode tube (not shown) through a cable 5 and a potentiometer set. The anode of a cathode tube is supplied with very high voltage through a cable 6 ending in a suction cup 6A by another high voltage output of this transformer.

FIG. 1 is an exploded view showing, in cross-section, the details of the embodiment by which it is possible to connect the focusing voltage output. It is to be understood that the connection of the other high-voltage output is made similarly.

During the moulding of the protective sheath for the coating resin of the coil 3, it is planned that there will be two ducts 7 and 8 formed so that they project on the protective sheath, preferably opposite the pins 4. The ducts 7, 8 are intended to take the ends of the cables 5 and 6, respectively. The ducts 7, 8 are short enough not to hamper the use and handling of the high-voltage transformer 1 and not to make them brittle, while at the same time being long enough to prevent any electrical arcover with any part connected to the ground. Their external length may advantageously range from 2 to 4 cm. The thickness of their walls, especially at their base, should be enough so that they are not brittle, this thickness ranging advantageously from about 2 to 5 mm.

The ducts 7 and 8 communicate with the internal space of the sheath and, especially, with the connecting terminals of the connectors or ends of the corresponding high-voltage windings. The ducts 7, 8 may stop at the level of their bases, at the junction with the sheath. Alternatively (as shown in the drawing), the ducts 7, 8 may extend to the inside of the sheath to join the connecting terminals, thus forming a conduit 9 within the envelope. The conduit 9 is capable of housing elements such as resistors, capacitors, and protective elements.

The duct 7 comprises, substantially at the level of its base, a slightly conical throat 10 which flares out outwards. The slightly conical shaft 10 can be used to properly center the end of the cable 5, 6 in the corresponding duct 7, 8. Just after the throat 10, towards the inside, there is a pad 11 made of conductive material placed in the duct 7, and in the present example more precisely in the conduit 9. The pad 11 tightly seals the duct 7. According to a preferred embodiment of the invention, the pad 11 is made of silicone charged with a powder which is a good conductor of electricity.

A conductor 12 connected, in a manner which is not shown, to the high-voltage winding that supplies the focusing voltage needed for the grids G2 and G3, is pushed into the inner side of the pad 11.

Advantageously, a conductor 13, with a discharging resistor 14 known as a bleeder, is pushed into the inner side of the pad 11. The other conductor of the discharging resistor 14 is pushed, (in a manner which is not shown) into the inner side of the pad of the duct 8.

A hooking device 15 is threaded to the end of the cable 5. The hooking device 15, as shown in the drawing, has the shape of a bushing which has one of its ends flared in the shape of a conical collar 16, while the other end of the hooking device 15 is split along one or two generating lines. The internal diameter of this bushing is substantially equal to the external diameter of the cable 5.

Furthermore, the duct 8 has a clip-on device 17 at its free end, working with the hooking device 15. According to the preferred embodiment shown in the drawing, the clip-on device 17 is a toe or protuberance formed by the inner wall of the duct 7. According to another embodiment (not shown), the clip-on device 17 is a cylindrical bushing threaded to the duct 7 and comprising a toe of this type. The dimensions of the conical collar 16 and the clip-on device 17 are such as to enable clipping on by keeping the cable 5 firmly in the duct 7 and such that, if necessary, the cable 5 can be withdrawn by exerting a strong pull on the cable 5 without causing any damage. The clip on device 17 can be made from the same material as that of the duct 7 or it can be metallic and mounted on the duct. The bushings referred to above are made of an appropriate plastic material.

The bushing forming the hooking device 15 is positioned on the cable 5 so that a bared end 18 of the cable 5 penetrates by at least 3 mm. into the pad 11 when the hooking device 15 and the clip-on device 17 are clipped on. This ensures good electrical contact and prevents the formation of ozone.

Figure 2:
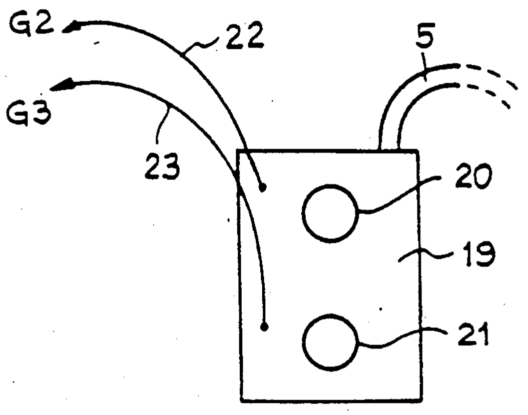
FIG. 2 is a highly simplified view from the top of a potentiometer set set on a printed circuit which is distinct from the transformer, this unit being connected to a transformer such as the one shown in FIG. 1.

FIG. 2 gives a simplified view of a potentiometer set 19 comprising potentiometers 20 and 21. The sliders of the potentiometers 20 and 21 are connected, in a way which is not shown, by the cables 22 and 23 to grids G2 and G3 respectively of the cathode tube 6A powered by the high-voltage transformer 1. The potentiometer set 19 either forms part of one of the printed circuits of the television receiver or is fixed to one of these circuits. One of the ends of the cable 5 is connected to the high-voltage transformer 1 and the other end of the cable 5 is connected to the potentiometer 19, advantageously by a device for the connection of a conductive pad similar to the one fitted in the duct 7. The cables 22 and 23 may be fixed to the potentiometer set, 19 permanently or in a detachable way. In the latter case, it is also possible to use a quick hooking device as well as conductive pads.

Figure 3:
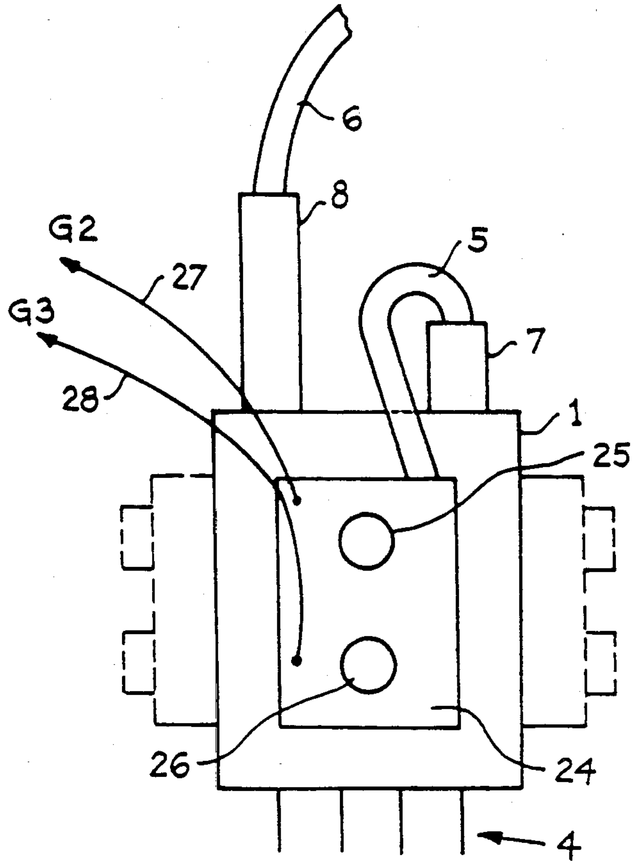
FIG. 3 is a very simplified front view of a high-voltage transformer according to the invention, showing several possibilities for the fastening of the potentiometer set.

FIG. 3 gives a simplified view of an embodiment in which a potentiometer set 24 with potentiometers 25 and 26 is fixed to one of the surfaces of the high-voltage transformer 1 by being clipped on. (The potentiometer set 24 is shown in solid lines for a first method and in broken lines for two other possibilities). Cables 27 and 28 providing connection to the grids G2 and G3 of the cathode tube can be fixed to the potentiometer set 24 permanently or in a detachable way. In the latter case, the fixing is also done by means of conductive pads.

The detachable fixing of the very high-voltage cable 6, with its suction cup 6A, in the duct 8 is similar to that of the cable 5 in the duct 7. Accordingly, it will not be described in greater detail.

Through an invention, the high-voltage transformer can be set on its printed circuit in the position where its radiation exerts the least influence on its environment, and the potentiometer set can be positioned where it is easy to adjust its potentiometers.

Another advantage of the invention is that it dissociates the transformer of the potentiometer set and the corresponding cables, thus simplifying repairs when one of the elements is out of order.

Finally, the transformer manufacturer no longer has to worry about bulky cables, and the user can install the high-voltage circuit elements at the end of the manufacturing process.

What is claimed is:

1. A high-voltage connection device comprising:
(a) a sleeve:
   (i) made of a rigid insulating material;
   (ii) having a passageway extending therethrough;
   (iii) having a first entrance at one end of said passageway; and
   (iv) having a second entrance at the other end of said passageway;
(b) a conductive pad:
   (i) received in said passageway;
   (ii) having a first face facing the first entrance of said passageway;
   (iii) having a second face facing the second entrance of said passageway; and
   (iv) made of a material that is capable of being penetrated by an easily deformable conductor; and
(c) first means for retaining said conductive pad in position in said passageway, whereby, in use, a first conductor can be introduced through the first entrance of said passageway and forced to penetrate the first face of said conductive pad and a second conductor can be introduced through the second entrance of said passageway and forced to penetrate the second face of said conductive pad, thereby enabling a high-voltage connection between the first and second conductors.

2. A high-voltage connection device as recited in claim 1 wherein said conductive pad is made of silicone charged with a conductive powder.

3. A high-voltage connection device as recited in claim 1 and further comprising:
(a) second means for tightly sealing the first conductor in said passageway and
(b) third means for tightly sealing the second conductor in said passageway.

4. An assembly comprising:
(a) a high-voltage transformer:
   (i) without lead-out cables and
   (ii) having a plurality of outputs;
(b) a potentiometer set;
(c) a plurality of high-voltage lead-out cables; and
(d) detachable connection means for connecting said plurality of high-voltage lead-out cables to said high-voltage transformer and to said potentiometer set, said detachable connection means comprising, for each output of said high-voltage transformer:
   (i) a first device for the quick hooking of one of said plurality of high-voltage lead-out cables, said first device being a clip-on device comprising a first part that forms one piece with a duct molded integrally with the protective sheath for a coating insulation of a transformer coil contained in said high-voltage transformer and a second part fixed to said one of said plurality of high-voltage lead-out cables near its end;
   (ii) a second device providing contact with the conductor or core of said one of said plurality of high-voltage lead-out cables; and
   (iii) a conductive pad received in said duct, an end of the conductor or core of said one of said plurality of high-voltage lead-out cables penetrating said conductive pad when the two parts of said first device are engaged with each other.

5. An assembly as recited in claim 4 wherein said duct has a slightly conical throat sized, shaped, and positioned to guide the end of said one of said plurality of high-voltage lead-out cables.

6. An assembly as recited in claim 4 wherein the end of the conductor or core of said one of said plurality of high-voltage lead-out cables penetrates said conductive pad inside said protective sheath.

7. An assembly as recited in claim 4 wherein a second one of said plurality of high-voltage lead-out cables is connected in a detachable way to said potentiometer set.

8. An assembly as recited in claim 4 wherein said potentiometer set is fixed to a printed circuit or forms part of a printed circuit.

9. An assembly as recited in claim 4 wherein said potentiometer set is fixed to one of the sides of said high-voltage transformer in a detachable way.

10. An assembly as recited in claim 4 wherein said potentiometer set is connected in a detachable way to the grids of a cathode tube powered by said high-voltage transformer by two of said plurality of high-voltage lead-out cables.

11. An assembly as recited in claim 4 wherein:
(a) said high-voltage transformer has two high-voltage outputs and
(b) the end of a conductor of a bleeder resistor is pushed into said conductive pad of said duct corresponding to each one of said high-voltage outputs inside said protective sheath.

* * * * *